US006404265B1

(12) United States Patent
Guido, Jr. et al.

(10) Patent No.: US 6,404,265 B1
(45) Date of Patent: *Jun. 11, 2002

(54) HIGHLY EFFICIENT DRIVER CIRCUIT FOR A SOLID STATE SWITCH

(75) Inventors: Louis A. Guido, Jr.; Harold R. Schnetzka, both of York, PA (US)

(73) Assignee: York International Corporation, York, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,502

(22) Filed: Aug. 13, 1999

(51) Int. Cl.[7] ............................................... H03K 17/72
(52) U.S. Cl. ........................................ 327/443; 327/475
(58) Field of Search ................................. 327/438, 439, 327/440, 443, 445, 453, 465, 468, 475, 476, 427, 434, 540, 109

(56) References Cited

U.S. PATENT DOCUMENTS

| | | | |
|---|---|---|---|
| 3,987,314 A | 10/1976 | Leowald et al. | |
| 4,074,346 A | 2/1978 | Riley | |
| 4,237,531 A | 12/1980 | Cutler et al. | |
| 4,238,821 A | 12/1980 | Walker | |
| 4,298,809 A | * 11/1981 | Onda et al. | 327/475 |
| 4,366,570 A | 12/1982 | Bees | 372/70 |
| 4,393,442 A | 7/1983 | Kähkipuro | |
| 4,424,544 A | 1/1984 | Chang et al. | |
| 4,464,585 A | * 8/1984 | Seki | 327/443 |

(List continued on next page.)

FOREIGN PATENT DOCUMENTS

| | | |
|---|---|---|
| DE | 3714683 | 10/1987 |
| EP | 0416933 A2 | 3/1991 |
| EP | 0893884 A2 | 1/1999 |
| JP | 61-147773 | 7/1986 |
| JP | 62-088425 | 4/1987 |
| JP | 04-344165 | 11/1992 |
| WO | WO 97/49165 | 12/1997 |

OTHER PUBLICATIONS

A.P. Connolly et al., "DC Gate Triggering Specifications," *SCR Manual Sixth Edition*, pp. 85–56.
J. G. Kassakian et al., "Chapter 6 High–Frenquency Switching dc/dc Converters," *Principles of Power Electronics*, pp. 110–116.
R. L. Boylestad, *Introductory Circuit Analysis*, 4th Edition, pp. 626–629.
An Optimum Gate Drive for High Power GTO Thyristors, H.A. Kojori et al, IEEE Applied Power Electronic Conference, pp. 439–444, Feb. 23. 1992.

*Primary Examiner*—Toan Tran
(74) *Attorney, Agent, or Firm*—Finnegan Henderson Farabow Garrett & Dunner, LLP

(57) ABSTRACT

Systems consistent with this invention comprise a trigger circuit for triggering a silicon device having a control terminal, where the silicon device is subject to variations in the intrinsic control requirements. The trigger circuit comprises a source of direct current (DC) supply voltage, and a DC-to-DC current mode Buck converter for converting the supply voltage into an output DC current not subject to undesired variations due to variations in the supply voltage, the Buck converter supplying to the control terminal a minimum current to turn on the silicon device despite the variations in the intrinsic control requirements. The silicon device may comprise a silicon controlled rectifier (SCR) with a gate terminal, an anode terminal, and a cathode terminal, and wherein the control terminal is the gate terminal, and wherein the variations in the intrinsic control requirements are variations in the intrinsic gate-to-cathode control current and voltage requirements.

42 Claims, 2 Drawing Sheets

U.S. PATENT DOCUMENTS

| | | |
|---|---|---|
| 4,475,150 A | 10/1984 | D'Atre et al. |
| 4,554,463 A | 11/1985 | Norbeck et al. |
| 4,672,303 A | 6/1987 | Newton |
| 4,675,543 A * | 6/1987 | Mitsuoka .................... 327/443 |
| 4,682,278 A | 7/1987 | Marquardt et al. |
| 4,710,692 A | 12/1987 | Libert et al. |
| 4,742,535 A | 5/1988 | Hino et al. |
| 4,833,628 A | 5/1989 | Curran, Jr. |
| 4,912,390 A | 3/1990 | Curran, Jr. et al. |
| 4,928,219 A | 5/1990 | Roslund et al. |
| 4,959,764 A | 9/1990 | Bassett |
| 4,982,145 A | 1/1991 | Peterson |
| 5,057,987 A | 10/1991 | Kumar et al. |
| 5,077,487 A * | 12/1991 | Lida ........................... 327/475 |
| 5,115,387 A | 5/1992 | Miller |
| 5,127,085 A | 6/1992 | Becker et al. |
| 5,151,642 A | 9/1992 | Lombardi et al. |
| 5,262,691 A | 11/1993 | Bailey et al. |
| 5,293,111 A | 3/1994 | Weinberg |
| 5,365,394 A | 11/1994 | Gomez Ibarguengoitia |
| 5,365,419 A | 11/1994 | Schreiber |
| 5,375,028 A | 12/1994 | Fukunaga |
| 5,376,830 A | 12/1994 | Ashley et al. |
| 5,414,341 A | 5/1995 | Brown |
| 5,606,482 A | 2/1997 | Witmer |
| 5,617,016 A | 4/1997 | Borghi et al. |
| 5,734,562 A | 3/1998 | Redl |
| 5,745,352 A | 4/1998 | Sandri et al. |
| 5,757,599 A | 5/1998 | Crane |
| 5,796,259 A | 8/1998 | Dickmander |
| 5,831,807 A | 11/1998 | Masannek et al. |

\* cited by examiner

HIGHLY EFFICIENT DRIVER CIRCUIT FOR A SOLID STATE SWITCH

BACKGROUND OF THE INVENTION

1. Field of the Invention

The present invention relates to driver circuits for switching solid state devices, and more particularly to driver circuits for switching silicon controlled rectifiers.

2. Description of the Related Art

Electric motors often use "silicon controlled rectifiers" ("SCRs"), which are also known as "thyristors," as part of the motor's control circuitry. An SCR can be thought of as switchable diode with three terminals: a gate, an anode, and a cathode. If a supply voltage that is less than a breakover voltage is applied across the anode and cathode of the SCR, and no "trigger" current or voltage (trigger signal) is applied to the gate, the SCR is "off," i.e., no current flows from the anode to the cathode. If a trigger signal is applied to the gate, the breakover voltage of the SCR drops to less than the voltage applied across the anode and cathode, and the SCR turns "on," i.e. current flows through the SCR from the anode to the cathode. Once on, the thyristor can remain on, provided the current through the SCR remains above a holding current, regardless of the trigger signal at the gate. To minimize the anode to cathode voltage drop across the SCR, and to minimize the power dissipated in the SCR, the trigger signal at the gate should be applied as long as current flows from anode to cathode. For the SCR to turn off, the anode to cathode current must be reduced to a level below the holding current value for the device.

A trigger circuit, or drive circuit, supplies the trigger signal to turn on the SCR. There are two variables that a designer takes into account when designing a trigger circuit. First, the power source to the trigger circuit is usually a DC voltage source that likely exhibits unwanted voltage fluctuations. These unwanted voltage fluctuations are usually caused by obtaining the DC voltage source from a step-down transformer including a full wave bridge and a capacitive input filter that are fed from an alternating current (AC) power line. The unwanted voltage fluctuations are caused by the AC power line variations and the transformer load regulation effect. Second, the gate trigger voltage, i.e., the gate to cathode voltage required to trigger the SCR varies from SCR to SCR. In addition, the necessary trigger voltage signal depends upon whether the SCR is on and conducting, or whether it is off and is to be turned on. Thus, the driver circuit must be designed to turn-on all SCRs it may encounter, i.e., all SCRs within a particular class of SCRs. Further, in order to save power, the trigger circuit must use a minimum current from the source voltage, but must still supply a sufficient voltage to trigger the SCR.

One solution to this problem has been to provide a trigger circuit that uses a switchable current source including a three terminal linear voltage regulator to provide a trigger signal sufficient to turn on all SCRs in a known class of SCRs. These trigger circuits, however, dissipate high levels of power themselves, which requires heat sinks and large supply transformers. Regulators, heat sinks, and transformers increase the size and cost of the driver circuit. Thus, there is a need for a trigger circuit to supply the appropriate trigger signal to turn on an SCR without the need for a three-terminal voltage regulator with its associated size and cost constraints.

SUMMARY OF THE INVENTION

The present invention constitutes an improvement over prior trigger circuits because it provides the required level of triggering current to turn on the SCR without a three terminal voltage regulator, thus reducing power consumption.

Systems consistent with this invention comprise a trigger circuit for triggering a silicon device having a control terminal, where the silicon device is subject to variations in the intrinsic control requirements. The trigger circuit comprises a source of direct current (DC) supply voltage, and a DC-to-DC current mode Buck converter for converting the supply voltage into an output DC current not subject to undesired variations due to variations in the supply voltage, the Buck converter supplying to the control terminal a minimum current to turn on the silicon device despite the variations in the intrinsic control requirements. The silicon device may comprise a silicon controlled rectifier (SCR) with a gate terminal, an anode terminal, and a cathode terminal, and wherein the control terminal is the gate terminal, and wherein the variations in the intrinsic control requirements are variations in the intrinsic gate-to-cathode control current and voltage requirements.

The summary and the following detailed description should not restrict the scope of the claimed invention. Both provide examples and explanations to enable others to practice the invention. The accompanying drawings, which form part of the detailed description, show embodiments of the invention, and together with the description, explain the principles of the invention.

BRIEF DESCRIPTION OF THE DRAWINGS

The accompanying drawings, illustrate several embodiments of the invention, and together with the description, serve to explain the principles of the invention. In the drawings.

The following description of embodiments of this invention refer to the accompanying drawings.

DESCRIPTION OF THE PREFERRED EMBODIMENT

Figure 1:
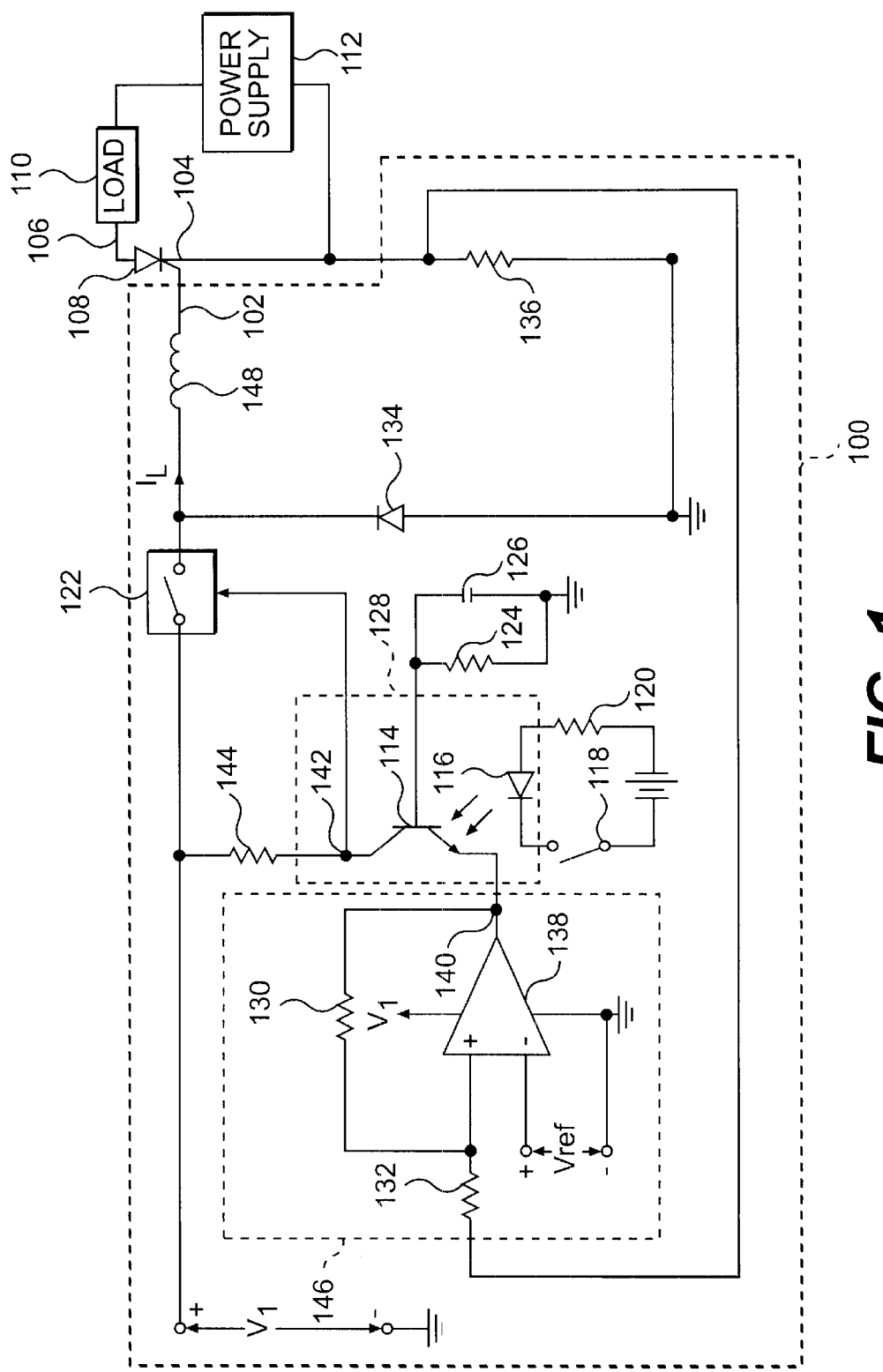
FIG. 1 is a schematic diagram of a trigger circuit, an SCR, a power supply, and a load all consistent with this invention.

FIG. 1 is a schematic diagram of a trigger circuit 100, an SCR 108, a load 110, and a power supply 112, all consistent with this invention. The triggered solid state device is SCR 108 having a control or gate terminal 102, a common input or anode terminal 106, and an output or cathode terminal 104. Passing gate current into gate 102 to cathode 104 triggers SCR 108, if an appropriate potential difference is established between anode 106 and cathode 104. When SCR 108 is triggered, current flows between anode 106 and cathode 104.

Trigger circuit 100 may turn on SCR 108 by supplying the minimum required current to gate 102 from a sufficiently large supply voltage V1. In general, the voltage and current necessary to trigger an SCR varies from SCR to SCR, but it is generally known what minimum voltage and current triggers a class of SCRs. Thus, a trigger circuit must supply the voltage and the current that will trigger all the SCRs in the particular class of SCRs.

SCR 108 is connected in series with load I 10 and power supply 112. When SCR 108 is triggered, power supply 112 energizes load 110, i.e., current flows through load 110, assuming that the voltage provided by power supply 112 is polarized to pass current through SCR 108 in a direction from anode 106 to cathode 104. If power supply 112 is an alternating current (AC) voltage source, current flows through load 110 and SCR 108 only during the positive half cycles of the AC voltage, i.e., when anode 106 is positive relative to cathode 104. By controlling the timing of the gate current supplied to gate terminal 102 in a well-known manner, the power flow to load 110 is regulated by varying the firing angle of SCR 108 during each positive half cycle of the applied AC voltage. If load 110 comprises, for example, an AC motor, the motor speed may be varied by regulating the power flow. The AC motor may, for instance, drive various components of a refrigeration system. The refrigeration system may include a compressor, a condenser, a heat-exchanger, and an evaporator.

Trigger circuit 100 depicted in FIG. 1 may be used in a control system for regulating the power delivered from an AC source to a DC load. It is widely-known that a network of such SCRs, each SCR having its own trigger circuit, may be used to adjust the power delivered to the load. For example, if a power supply provides three-phase AC power, a network of SCRs may comprise a three-phase full wave rectifier bridge having three pairs of SCRs, each pair receiving one of the three alternating phase voltages. Six independent trigger circuits would control the conduction angles of the six SCRs in the network to establish at the output of the bridge a desired DC voltage. This network arrangement may be used to vary the DC voltage delivered to load 110.

Another network arrangement of SCRs may provide a three-phase AC switch for varying the magnitude of a three phase AC power supply, such as a three-phase motor. Such a switch would also include three pairs of SCRs, each pair connected to one of the three phase voltages of the AC power supply. In such an arrangement, the two SCRs are connected in antiparallel with the anode of each connected to the cathode of the other. By regulating the conduction angles of the six SCRs, the SCR network establishes the desired three phase currents supplied to the three-phase AC motor.

Systems consistent with this invention employ a current mode DC-to-DC Buck converter to trigger, or drive, the gate of SCR 108. Trigger circuit 100 comprises the Buck converter including a voltage comparator circuit 146, an optically coupled isolator 128, a voltage controlled main switch 122, a resistor 144, a free wheeling diode 134, a sense resistor 136, and an inductor 148.

In system consistent with this invention, supply voltage V1 may be unregulated and easily obtained by stepping down, rectifying, and filtering an AC line voltage. Supply voltage V1 delivers the power needed to turn on SCR 108 and to cover power losses in trigger circuit 100.

Optically-coupled isolator 128 comprises a light emitting diode (LED) 116 and an optically-sensitive transistor 114. To initiate gate current to trigger SCR 108, a trigger switch 118 is closed causing current to flow through LED 116. Light emitted from LED 116 saturates the base of transistor 114 causing it to conduct, or turn on. Isolator 128 provides electrical isolation between low-voltage logic circuitry for trigger switch 118 and the high-voltage circuit comprising transistor 114, main switch 122, inductor 148, diode 134, SCR 108, etc. Resistor 124 and capacitor 126 provide noise immunity that prevents false triggering of transistor 114 due to spurious noise.

When transistor 114 is turned off, voltage comparator circuit 146 is isolated from resistor 144 and no current flows through resistor 144. This causes main switch 122 to remain open, or off. When transistor 114 turns on, a voltage comparator circuit 146 modulates voltage controlled main switch 122. Initially, comparator 146 outputs a low voltage on an output terminal 140 and this causes a voltage drop across a resistor 144 that causes main switch 122 to close, or turn on. Then, a voltage appears across inductor 148, and this, in turn, causes an inductor current $I_L$ to flow through inductor 148.

Comparator 146 comprises a voltage comparator 138, a feedback resistor 130, an input resistor 132, and a reference voltage Vref. Sense resistor 136, reference voltage Vref, feedback resistor 130, and input resistor 132 are selected so that the average value of inductor current $I_L$ is set to the minimum current necessary to trigger every SCR in a known class of SCRs. The current through inductor 148 flows into gate 102 of SCR 108, out cathode 104, through sense resistor 136, and returns to ground. Source voltage V1 is selected to be sufficiently high so that the initial rate of current $I_L$ rise into SCR gate 102 is small relative to the duty cycle of trigger switch 118.

Comparator 146 has a hysteresis characteristic with an upper threshold voltage UT and a lower threshold voltage LT. As apparent to one skilled in the art, assuming that the value of resistor 144 is much less than the value of input resistor 132 ($R_{132}$), and that the value of resistor 144 is much less than the value of feedback resistor 130 ($R_{130}$), upper threshold UT is $$UT = Vref[1 + (R_{132}/R_{130})],$$

and lower threshold voltage LT is $$LT = Vref + (Vref - V1)(R_{132})/(R_{130}).$$

Comparator 146 compares the voltage drop across sense resistor 136 to one of the two threshold voltages. Comparator 146 allows its output on output terminal 140 to be pulled high once the voltage across sense resistor 136 exceeds upper threshold voltage UT of comparator circuit 146. When output terminal 140 of comparator 146 has a high voltage, and transistor 114 is on, no current flows through resistor 144, there is no voltage drop across resistor 144, and main switch 122 opens, or turns off. Inductor 148 opposes an instantaneous change in current flow and continues to provide current to gate 102 of SCR 108. In this case, current $I_L$ through inductor 148 flows out cathode 104, through sense resistor 136, through a free-wheeling diode 134, and back to inductor 148. During this time, current $I_L$ through inductor 148 decreases.

As current $I_L$ through inductor 148 decreases, the voltage across sense resistor 136 also decreases and eventually drops to the lower threshold voltage LT of comparator 146. This causes comparator 146 to switch low, which turns on main switch 122, and the whole cycle repeats itself. Hysteresis in comparator 138 is provided by feedback resistor 130 and input resistor 132, and this, in combination with the inductive value of inductor 148, source voltage V1, reference voltage Vref, and the intrinsic voltage characteristics of the SCR, determines the switching frequency of trigger circuit 100.

Figure 2:
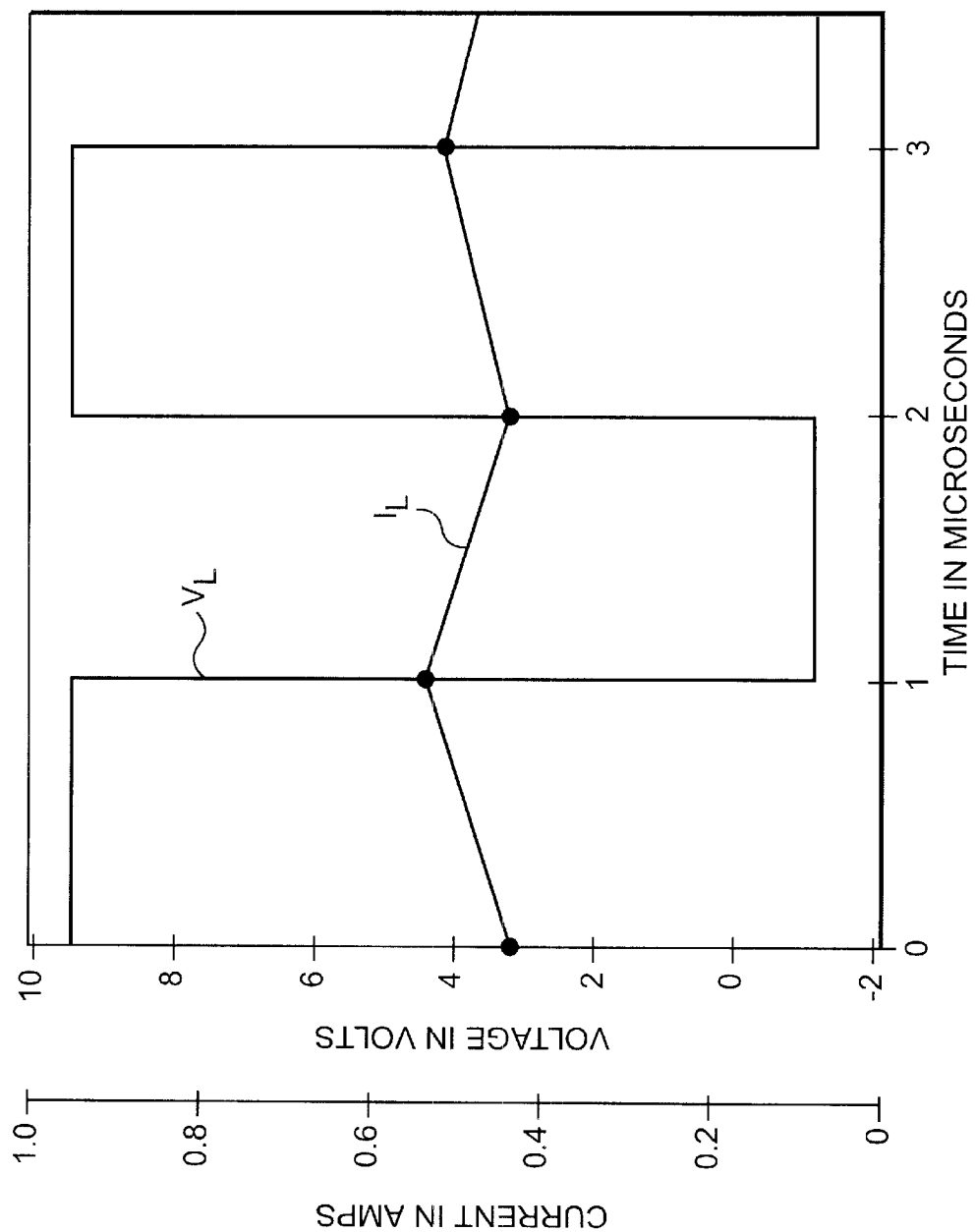
FIG. 2 is a diagram of the voltage across and current through inductor 148 shown in FIG. 1 with respect to time.

FIG. 2 is a diagram of the voltage across inductor 148 and current $I_L$ through inductor 148 with respect to time. The voltage signal $V_L$, of course, is the square shaped signal, and current $I_L$ is the triangular shaped signal. The average current through inductor 148, in this example, is approximately 0.5 amps. The period of voltage signal $V_L$ is approximately 2 microseconds.

One advantage of trigger circuit 100 over existing current source trigger circuits is that there is no need for a linear regulator to provide a constant current source to trigger an SCR. When a regulator is used, the average power of such a trigger circuit is the average voltage drop across the trigger circuit multiplied by the average current supplied to the SCR gate. The power consumed by a regulator is high, which requires heat sinks that increase size and cost. Furthermore, with a voltage regulator, the trigger circuit requires additional power which causes other components, such as the isolation transformer, to grow in size and cost. By contrast, trigger circuit 100 require less power, equal to the average voltage drop across the gating circuit multiplied by the average current supplied to the gate of the SCR, multiplied by the duty cycle of main switch 122.

This invention provides a unique trigger circuit 100 for triggering a solid state switch with a constant current source, but without a voltage regulator. Trigger circuit 100 is immune to supply voltage variations and different intrinsic voltage control characteristics. The current supplied by trigger circuit 100 to the solid state device is selected to match the solid state switch type, precluding needless power dissipation.

A method and apparatus for detecting a failed thyristor or SCR is disclosed in U.S. Pat. No. 6,211,792, entitled "Method and Apparatus for Detecting a Failed Thyristor," which is hereby incorporated by reference. Another method and apparatus for detecting a failed thyristor or SCR is disclosed in a patent application entitled "Method and Apparatus for Detecting a Failed Thyristor," application Ser. no. 09/373,501, filed Aug. 13, 1999, and assigned to the same assignee as this application, which is hereby incorporated by reference.

Those skilled in the art recognize that various modifications and variations can be made in the preceding examples without departing from the scope or spirit of the invention. For example, SCR 108 could be replaced by a variety of other semiconductor devices, such as a bipolar junction transistor (BJT) transistor. In the case of a BJT transistor, the base, emitter, and collector terminals of the transistor would serve as the gate, cathode, and anode, respectively.

The description of the invention does not limit the invention. Instead, it provides examples and explanations to allow persons of ordinary skill to appreciate different ways to practice the invention. The following claims define the true scope and spirit of the invention.

What is claimed is:

1. A trigger circuit for triggering a silicon device having a control terminal, a first device terminal, and a second device terminal, said trigger circuit comprising:
   a source of a direct current (DC) supply voltage; and
   a DC-to-DC converter for converting the supply voltage into an output DC current, the converter supplying to the control terminal the output DC current to turn on the silicon device, the converter comprising
   an inductor coupled between the control terminal and a first switch terminal of a main switch, wherein a second switch terminal of the main switch is coupled to the supply voltage, wherein the main switch allows current to flow from the second switch terminal to the first switch terminal when closed and does not allow current to flow from the second switch terminal to the first switch terminal when open;
   a sense resistor for sensing the current through the inductor, wherein the sense resistor is coupled between the second device terminal and a ground, and wherein a value indicative of the current through the inductor is a voltage across the sense resistor;
   a free wheeling diode coupled between the ground and the first switch terminal of the main switch so that current may flow from ground through the diode to the first switch terminal of the main switch; and
   a comparator for comparing the value indicative of the current through the inductor to a control value, the comparator controlling when the main switch opens or closes.

2. The trigger circuit of claim 1, wherein the silicon device is a silicon controlled rectifier (SCR) wherein the control terminal is a gate terminal, the first device terminal is an anode terminal, and the second device terminal is a cathode terminal.

3. The trigger circuit of claim 1 wherein the silicon device is a transistor.

4. The trigger circuit of claim 3, wherein the transistor is a bipolar junction transistor wherein the first device terminal is a collector, the second device terminal is an emitter, and the control terminal is a base.

5. The trigger circuit of claim 1, wherein the comparator has hysteresis and wherein the control value includes an upper threshold value and a lower threshold value, and wherein when the value indicative of the current drops below the lower threshold, the main switch closes, and when the value indicative of the current rises above the upper threshold, the main switch opens.

6. The trigger circuit of claim 2, wherein the converter further comprises a trigger switch that prevents the comparator from closing the main switch when the SCR is not to be triggered and allowing the comparator to control the main switch when the SCR is to be triggered.

7. A trigger circuit for triggering a silicon device having a control terminal, a first device terminal, and a second device terminal, said trigger circuit comprising:
   a source of a direct current (DC) supply voltage; and
   means for converting the supply voltage into an output DC current, wherein the means for converting supplies to the control terminal the output DC current to turn on the silicon device, the converter comprising
   an inductor coupled between the control terminal and a first switch terminal of a main switch, wherein a second switch terminal of the main switch is coupled to the supply voltage, wherein the main switch allows current to flow from the second switch terminal to the first switch terminal when closed and does not allow current to flow from the second switch terminal to the first switch terminal when open;
   means for sensing the current through the inductor, the means for sensing outputting a value indicative of the current, wherein the means for sensing is a sense resistor coupled between the second device terminal and a ground, and wherein the value indicative of the current through the inductor is a voltage across the sense resistor;
   a free wheeling diode coupled between the ground and the first switch terminal of the main switch so that current may flow from ground through the diode to the first switch terminal of the main switch; and
   means for comparing the value indicative of the current through the inductor to a control value, wherein the means for comparing controls when the main switch opens or closes.

8. The trigger circuit of claim 7, wherein the silicon device is a silicon controlled rectifier (SCR) wherein the control terminal is a gate terminal, the first device terminal is an anode terminal, and the second device terminal is a cathode terminal.

9. The trigger circuit of claim 7, wherein the silicon device is a transistor.

10. The trigger circuit of claim 9, wherein the transistor is a bipolar junction transistor wherein the first device terminal is a collector, the second device terminal is an emitter, and the control terminal is a base.

11. The trigger circuit of claim 7, wherein the means for comparing has hysteresis and wherein the control value includes an upper threshold value and a lower threshold value, and wherein when the value indicative of the current drops below the lower threshold, the main switch closes, and when the value indicative of the current rises above the upper threshold, the main switch opens.

12. The trigger circuit of claim 8, wherein the converter further comprises a trigger switch that prevents the means for comparing from closing the main switch when the SCR is not to be triggered and allowing the means for comparing to control the main switch when the SCR is to be triggered.

13. A refrigeration system comprising a motor controller, the motor controller including a trigger circuit for triggering a silicon device having a control terminal, a first device terminal, and a second device terminal, said trigger circuit comprising:
  a source of a direct current (DC) supply voltage; and
  a DC-to-DC converter for converting the supply voltage into an output DC current, the converter supplying to the control terminal the output DC current to turn on the silicon device, the converter comprising
    an inductor coupled between the control terminal and a first switch terminal of a main switch, wherein a second switch terminal of the main switch is coupled to the supply voltage, wherein the main switch allows current to flow from the second switch terminal to the first switch terminal when closed and does not allow current to flow from the second switch terminal to the first switch terminal when open;
    a sense resistor for sensing the current through the inductor, wherein the sense resistor is coupled between the second device terminal and a ground, and wherein a value indicative of the current through the inductor is a voltage across the sense resistor;
    a free wheeling diode coupled between the ground and the first switch terminal of the main switch so that current may flow from ground through the diode to the first switch terminal of the main switch; and
    a comparator for comparing the value indicative of the current through the inductor to a control value, the comparator controlling when the main switch opens or closes.

14. The refrigeration system of claim 13, wherein the silicon device is a silicon controlled rectifier (SCR) wherein the control terminal is a gate terminal, the first device terminal is an anode terminal, and the second device terminal is a cathode terminal.

15. The refrigeration system of claim 13 wherein the silicon device is a transistor.

16. The refrigeration system of claim 15, wherein the transistor is a bipolar junction transistor wherein the first device terminal is a collector, the second device terminal is an emitter, and the control terminal is a base.

17. The refrigeration system of claim 13, wherein the comparator has hysteresis and wherein the control value includes an upper threshold value and a lower threshold value, and wherein when the value indicative of the current drops below the lower threshold, the main switch closes, and when the value indicative of the current rises above the upper threshold, the main switch opens.

18. The refrigeration system of claim 14, wherein the converter further comprises a trigger switch that prevents the comparator from closing the main switch when the SCR is not to be triggered and allowing the comparator to control the main switch when the SCR is to be triggered.

19. A trigger circuit for triggering a silicon device having a control terminal, said trigger circuit comprising:
  a single source of direct current (DC) supply voltage to supply power to the control terminal for triggering the silicon device; and
  a DC-to-DC current mode Buck converter for converting the supply voltage into an output DC current, the Buck converter supplying to the control terminal the output DC current to turn on the silicon device.

20. The trigger circuit of claim 19, wherein the silicon device is a silicon controlled rectifier (SCR) with a gate terminal, an anode terminal, and a cathode terminal, and wherein the control terminal is the gate terminal.

21. The trigger circuit of claim 20, wherein the Buck converter comprises
  an inductor coupled between the gate terminal and a first terminal of a main switch, a second terminal of the main switch coupled to the supply voltage, the main switch allowing current to flow from the second terminal to the first terminal when closed and not allowing current to flow from the second terminal to the first terminal when open;
  a sensor for sensing the current through the inductor, the sensor outputting a value indicative of the current;
  a current flow device coupled between a ground and the first terminal of the main switch so that current may flow from ground through the current flow device to the first terminal of the main switch when the main switch is turned off; and
  a comparator for comparing the value indicative of the current through the inductor to a control value, the comparator controlling when the main switch opens or closes.

22. The trigger circuit of claim 21, wherein the sensor is a sense resistor coupled between the cathode of the SCR and the ground, and wherein the value indicative of the current through the inductor is a voltage across the sense resistor.

23. The trigger circuit of claim 21, wherein the comparator has hysteresis and wherein the control value includes an upper threshold value and a lower threshold value, and wherein when the value indicative of the current drops below the lower threshold, the main switch closes, and when the value indicative of the current rises above the upper threshold, the main switch opens.

24. The trigger circuit of claim 21, wherein the Buck converter further comprises a trigger switch that prevents the comparator from closing the main switch when the SCR is not to be triggered and allows the comparator to control the main switch when the SCR is to be triggered.

25. A refrigeration system comprising a motor, the motor including a trigger circuit for triggering a silicon device having a control terminal, said trigger circuit comprising:
  a single source of direct current (DC) supply voltage to supply power to the control terminal for triggering the silicon device; and
  a DC-to-DC current mode Buck converter for converting the supply voltage into an output DC current, the Buck converter supplying to the control terminal the output DC current to turn on the silicon device.

26. The refrigeration system of claim 25, wherein the silicon device is a silicon controlled rectifier (SCR) with a gate terminal, an anode terminal, and a cathode terminal, and wherein the control terminal is the gate terminal.

27. The refrigeration system of claim 26, wherein the Buck converter comprises an inductor coupled between the gate terminal and a first terminal of a main switch, a second terminal of the main switch coupled to the supply voltage, the main switch allowing current to flow from the second terminal to the first terminal when closed and not allowing current to flow from the second terminal to the first terminal when open;

a sensor for sensing the current through the inductor, the sensor outputting a value indicative of the current;

a current flow device coupled between a ground and the first terminal of the main switch so that current may flow from ground through the current flow device to the first terminal of the main switch when the main switch is turned off; and a comparator for comparing the value indicative of the current through the inductor to a control value, the comparator controlling when the main switch opens or closes.

28. The refrigeration system of claim 27, wherein the sensor is a sense resistor coupled between the cathode of the SCR and the ground, and wherein the value indicative of the current through the inductor is a voltage across the sense resistor.

29. The refrigeration system of claim 27, wherein the comparator has hysteresis and wherein the control value includes an upper threshold value and a lower threshold value, and wherein when the value indicative of the current drops below the lower threshold, the main switch closes, and when the value indicative of the current rises above the upper threshold, the main switch opens.

30. The refrigeration system of claim 27, wherein the Buck converter further comprises a trigger switch that prevents the comparator from closing the main switch when the SCR is not to be triggered and allows the comparator to control the main switch when the SCR is to be triggered.

31. A trigger circuit for triggering a silicon device having a control terminal, a first device terminal, and a second device terminal, said trigger circuit comprising:

a source of a direct current (DC) supply voltage; and a switching DC-to-DC converter for converting the supply voltage into an output DC current, the converter supplying to the control terminal the output DC current to turn on the silicon device, the converter comprising an inductor coupled between the control terminal and a first switch terminal of a main switch, wherein a second switch terminal of the main switch is coupled to the supply voltage, wherein the main switch allows current to flow from the second switch terminal to the first switch terminal when closed and does not allow current to flow from the second switch terminal to the first switch terminal when open, wherein when the silicon device is turned off the main switch is continuously turned off, wherein when the main switch is turned off the main switch prevents current from flowing from the voltage supply to the inductor, and wherein when the silicon device is turned on, the main switch periodically turns on and off.

32. The trigger circuit of claim 31, wherein the converter further comprises a sense resistor for sensing the current through the inductor, wherein the sense resistor is coupled between the second device terminal and a ground, and wherein a value indicative of the current through the inductor is a voltage across the sense resistor;

a current flow device coupled between the ground and the first switch terminal of the main switch so that current may flow from ground through the current flow device to the first switch terminal of the main switch when the main switch is turned off; and a comparator for comparing the value indicative of the current through the inductor to a control value, the comparator controlling when the main switch opens or closes.

33. The trigger circuit of claim 32, wherein the silicon device is a silicon controlled rectifier (SCR) wherein the control terminal is a gate terminal, the first device terminal is an anode terminal, and the second device terminal is a cathode terminal.

34. The trigger circuit of claim 32, wherein the silicon device is a transistor.

35. The trigger circuit of claim 32, wherein the comparator has hysteresis and wherein the control value includes an upper threshold value and a lower threshold value, and wherein when the value indicative of the current drops below the lower threshold, the main switch closes, and when the value indicative of the current rises above the upper threshold, the main switch opens.

36. The trigger circuit of claim 33, wherein the converter further comprises a trigger switch that prevents the comparator from closing the main switch when the SCR is not to be triggered and allows the comparator to control the main switch when the SCR is to be triggered.

37. A refrigeration system comprising a motor controller, the motor controller including a trigger circuit for triggering a silicon device having a control terminal, said trigger circuit comprising:

a source of a direct current (DC) supply voltage; and a switching DC-to-DC converter for converting the supply voltage into an output DC current, the converter supplying to the control terminal the output DC current to turn on the silicon device, the converter comprising an inductor coupled between the control terminal and a first switch terminal of a main switch, wherein a second switch terminal of the main switch is coupled to the supply voltage, wherein the main switch allows current to flow from the second switch terminal to the first switch terminal when closed and does not allow current to flow from the second switch terminal to the first switch terminal when open, and wherein when the silicon device is turned off the main switch is continuously turned off, wherein when the main switch is turned off the main switch prevents current from flowing from the voltage supply to the inductor, and wherein when the silicon device is turned on, the main switch periodically turns on and off.

38. The refrigeration system of claim 37, wherein the trigger circuit further comprises a sense resistor for sensing the current through the inductor, wherein the sense resistor is coupled between the second device terminal and a ground, and wherein a value indicative of the current through the inductor is a voltage across the sense resistor;

a current flow device coupled between the ground and the first switch terminal of the main switch so that current may flow from ground through the current flow device to the first switch terminal of the main switch when the main switch is turned off; and a comparator for comparing the value indicative of the current through the inductor to a control value, the comparator controlling when the main switch opens or closes.

39. The refrigeration system of claim 38, wherein the silicon device is a silicon controlled rectifier (SCR) wherein the control terminal is a gate terminal, the first device terminal is an anode terminal, and the second device terminal is a cathode terminal.

40. The refrigeration system of claim 38, wherein the silicon device is a transistor.

41. The refrigeration system of claim 38, wherein the comparator has hysteresis and wherein the control value includes an upper threshold value and a lower threshold value, and wherein when the value indicative of the current drops below the lower threshold, the main switch closes, and when the value indicative of the current rises above the upper threshold, the main switch opens.

42. The refrigeration system of claim 39, wherein the converter further comprises a trigger switch that prevents the comparator from closing the main switch when the SCR is not to be triggered and allows the comparator to control the main switch when the SCR is to be triggered.

* * * * *